(12) United States Patent
Milanesi et al.

(10) Patent No.: US 6,483,085 B1
(45) Date of Patent: Nov. 19, 2002

(54) TEMPERATURE CONTROL SYSTEM AND METHOD FOR AN INTEGRATED CIRCUIT

(75) Inventors: Andrea Milanesi, Casalnoceto; Vanni Poletto, Casale Monferrato; Paolo Ghigini, Pavia, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/712,412

(22) Filed: Nov. 13, 2000

(30) Foreign Application Priority Data

Nov. 15, 1999 (IT) .......................... MI99A2374

(51) Int. Cl.$^7$ ................................. H05B 1/02
(52) U.S. Cl. .................. 219/497; 219/492; 219/501; 257/467
(58) Field of Search ................. 219/209, 210, 219/497, 499, 501, 506, 481; 307/38–41, 117; 257/467, 341

(56) References Cited

U.S. PATENT DOCUMENTS

| | | | | |
|---|---|---|---|---|
| 3,585,267 A | * | 6/1971 | Obersby | 219/501 |
| 4,924,112 A | * | 5/1990 | Anderson et al. | 307/270 |
| 5,189,283 A | * | 2/1993 | Carl, Jr. et al. | 219/497 |
| 5,389,813 A | * | 2/1995 | Schwob | 257/341 |
| 5,670,012 A | * | 9/1997 | Porfido et al. | 219/544 |
| 6,213,404 B1 | * | 4/2001 | Dushane et al. | 236/51 |

* cited by examiner

*Primary Examiner*—Mark Paschall
(74) *Attorney, Agent, or Firm*—Lisa K. Jorgenson; E. Russell Tarleton; SEED IP Law Group PLLC

(57) ABSTRACT

A temperature control system and method for integrated circuits, particularly those having a plurality of channels or power devices. The temperature control system for an integrated circuit includes at least a heat generating device; a sensor element providing a signal correlated to the working conditions of said the heat generating device such as a signal proportional to the dissipated power of the heat generating device; an elaboration circuit of the signal correlated to the working conditions of the heat generating device; and a turning off circuit of said at least a heat generating device responsively to a signal of said elaboration circuit.

19 Claims, 4 Drawing Sheets

TEMPERATURE CONTROL SYSTEM AND METHOD FOR AN INTEGRATED CIRCUIT

TECHNICAL FIELD

The present invention refers to a temperature control system and method for integrated circuits, particularly for those having a plurality of channels or power devices.

BACKGROUND OF THE INVENTION

Most of the integrated circuits have inside a circuit (commonly referred to as Thermal Warning) that senses the silicon temperature, and when it senses a prefixed value, the circuit generates an alarm signal. This signal is usually used to turn off the devices or circuit blocks that are responsible for the excessive heat dissipation.

When such an emergency occurs all the circuits that could have generated the temperature increase are usually deactivated. However, there are applications in which totally interrupting the device functions could jeopardize the personal safety of the users or create problems to other parts of the apparatus. Therefore it has been attempted to interrupt only the channels or the devices that at that time are dissipating the most heat.

The most immediate way to realize a temperature sensor is that of using the base-emitter junction of a bipolar transistor. The voltage at the junction terminals varies with a constant gradient as the temperature varies (around −2 mV/° C.). Knowing the base-emitter voltage at a prefixed temperature it is possible to effect a fairly accurate measurement of this parameter.

At environment temperature the bipolar transistor, used like a temperature sensor, is off, and therefore the collector voltage is at a high level, as the temperature increases, the threshold voltage of the base-emitter junction decreases. At the prefixed temperature as activation value of the circuit, the transistor switches on and its collector signal goes to low level, signaling an anomaly.

In a multi-channel device, a method used to establish when a device anomaly occurs, in order to switch off only such a device, is that of increasing the number of temperature sensors, one for each device, and putting them near the critical points. The bias circuit of the various transistors used as temperature sensors, can be, for instance, only one, and in proximity of the critical points only the sensor used for the measurement could be placed.

With this solution a further sensor is usually combined that senses the silicon temperature in the part of the device where there is never a high power dissipation. This sensor has a more elevated temperature activation threshold than the previous sensor and has the purpose to switch off the device totally in case it reaches such a threshold.

An intrinsic problem for this type of solution is related to the temperature profiles that occur during brief transients (in the order of milliseconds) in which an elevated power is dissipated. The elevated power dissipation of a channel during a transient, seen in the proximity between the various channels placed in an integrated circuit, could make the temperature rise also in the area near the channel. In such a case, the turning off of a channel could also occur even if there is not a real malfunctioning.

Such a danger increases when the devices must work in boundary conditions, near to the thermal protection intervention temperature, such as happens for instance in automotive circuits placed in proximity to the car elements that carry the environmental temperature above 100 degrees centigrade.

SUMMARY OF THE INVENTION

In view of the described state of the art, the disclosed embodiment of the present invention provides a temperature control system for an integrated circuit that is able to identify correctly the device that is making the temperature of the integrated circuit rise.

According to one embodiment of the present invention, a temperature control system for an integrated circuit is provided, including:
  at least one device that generates heat because of elevated dissipated power values;
  a sensor element providing a signal correlated to the working conditions of the at least one heat generating device;
  an elaboration circuit for said signal correlated to the working conditions of said at least a heat generating device;
  a turning off circuit of said at least one heat generating device responsive to a signal of said elaboration circuit;
  wherein said sensor element provides a signal proportional to the dissipated power of the at least one heat generating device.

A temperature control method for an integrated circuit is provided that has at least a heat generating device, and includes the following phases:
  sensing the working conditions of the at least one heat generating device;
  elaborating the information relative to the working conditions of the at least one heat generating device;
  generating a turning off signal of the at least one heat generating device responsively to the elaborated information;
  wherein the sensed working conditions are relative to the dissipated power of the at least one heat generating device.

With the device and method of the present invention, it is possible to realize a temperature control system for integrated circuits that correctly identifies the device that is overcoming the dissipation limits by obtaining the information relative to the dissipated power and not relative to the device temperature that could be altered by the nearby circuits.

Furthermore, the use of only a sensor, placed at a certain distance from the power transistors or channels, enables filtering of temperature transients that could distort the measurement and cause the turning off of a channel as well when this works correctly.

BRIEF DESCRIPTION OF THE DRAWINGS

The features and the advantages of the present invention will be more evident from the following detailed description of a particular embodiment, illustrated as a non-limiting example in the annexed drawings, wherein.

DETAILED DESCRIPTION OF THE INVENTION

Figure 1:
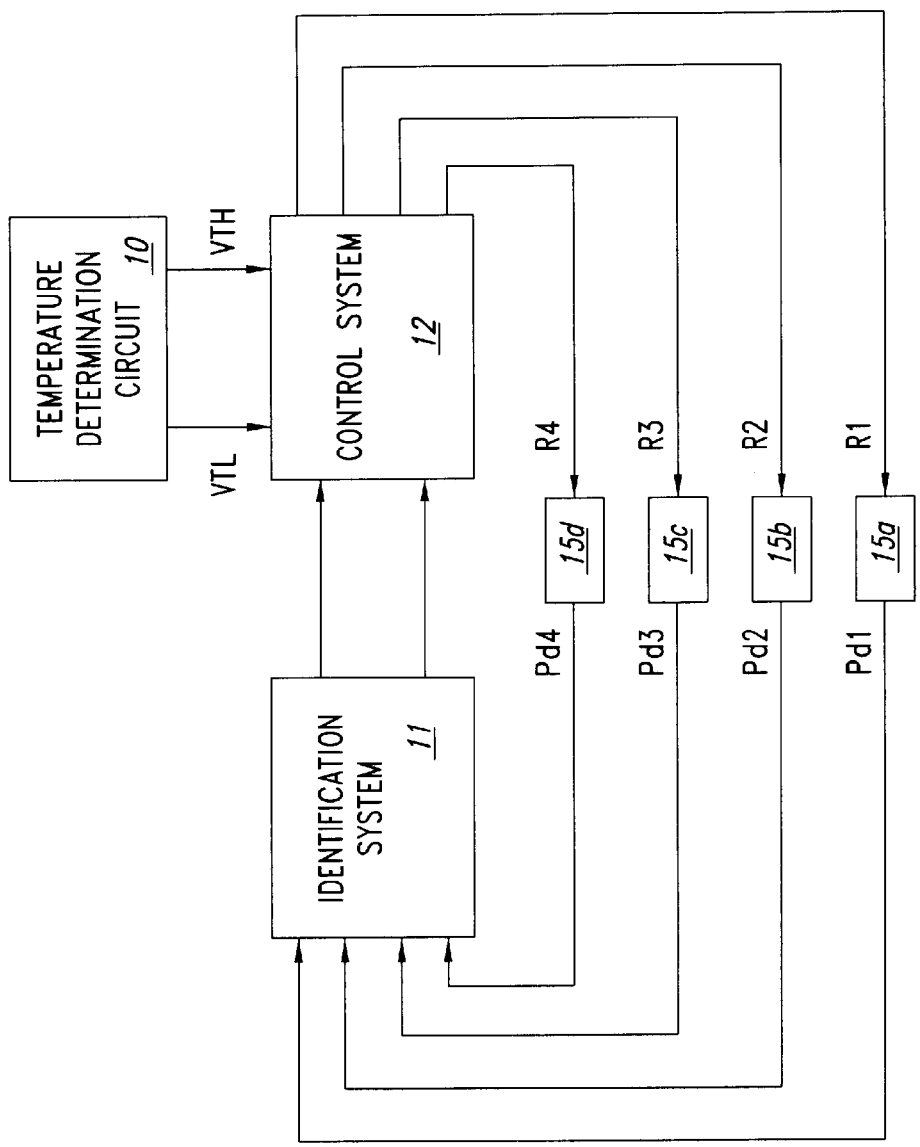
FIG. 1 represents a block schematic of a temperature control system for an integrated circuit in accordance with the present invention.

In FIG. 1 it is possible to see a block scheme of a temperature control system for a multichannel integrated circuit in accordance with one embodiment of the present invention. In FIG. 1 only 4 channels 15a, 15b, 15c and 15d are represented for descriptive simplicity but they could be a greater or a lesser number. The channels represent a power device or a block of circuit that when activated could dissipate such a power to make the temperature of the integrated circuit silicon rise, such a device or block could be deactivated on command. To the aims of the present invention, each channel also comprises a circuit able to provide a signal proportional to its own dissipated power as explained in more detail below. Each of the 4 channels 15a, 15b, 15c and 15d has a channel turning off (or reset) input, respectively R1, R2, R3 and R4, for a turning-off circuit, and an output signal proportional to its own dissipated power, respectively Pd1, Pd2, Pd3 and Pd4. The signals Pd1, Pd2, Pd3 and Pd4 are connected in input to an identification system 11 of the information on the dissipated power, at the output of which are available the outputs B0, B1 connected in input to a control system 12 of the information on the dissipated power, that provides in turn in output the turning off signals of the above channels, respectively R1, R2, R3 and R4.

The outputs B0, B1 identify which channel, at a stated moment, is dissipating the greatest power quantity. In general, if n is the number of the channels (15a, 15b, 15c and 15d) and m the output number (B0, B1) of identification of the channel, it will be $2^m \geq n$.

On the device are present temperature determination means 10 placed at a distance from the points in which power is dissipated, that is from the channels. This means that the temperature increase due to the dissipation of the impulsive type is integrated by the silicon thermal capability. They provide to the control system 12 an overcoming signal VTL of a first prefixed threshold TL and an overcoming signal VTH of a second prefixed threshold TH. Particularly, the signal VTL is at high level until the achievement of the temperature TL after which it goes to low levels, and the signal VTH is at a high level until the achievement of the temperature TH, after which it goes to a low level.

Figure 2:
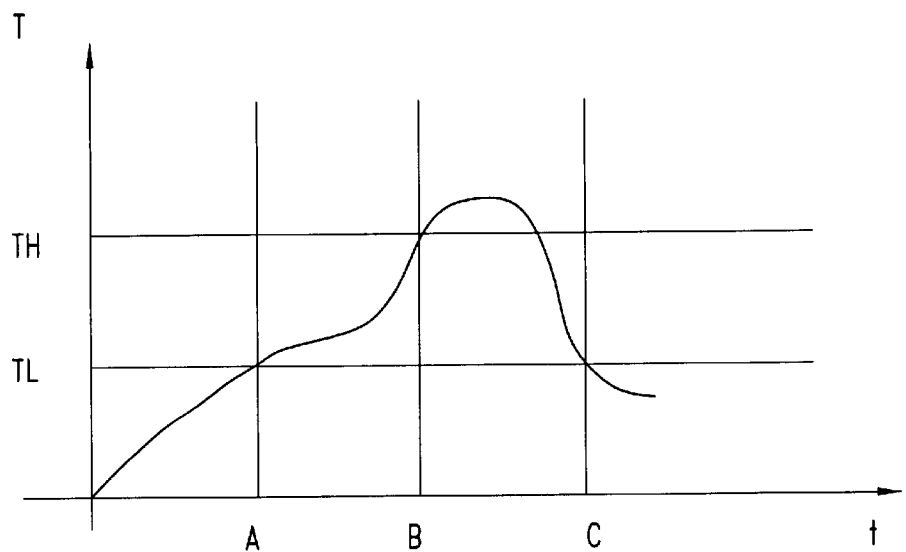
FIG. 2 shows through the silicon temperature diagram at the varying of the time how the control circuit according to the present invention activates itself.

With reference now to FIG. 2, shown therein is an example of the diagram of the silicon temperature T measured by the means 10 at the varying of the time t. All the channels are working until the device average temperature, measured by the means 10, is lower than the temperature TL. When this temperature overcomes the first prefixed threshold TL, at point A of FIG. 2, the control system 12 deactivates the channel that dissipates the highest power, by means of the respective turning off signal, and it prevents it from switching on again as long as the temperature is above TL. The channel that dissipates the highest power is determined on the basis of a calculation of the real power dissipated by each channel and provided to the identification system 11 by the signals Pd1, Pd2, Pd3 and Pd4.

After a channel turns off, the device temperature should decrease. If this does not happen, like in FIG. 2, and on the contrary the temperature increases, then when the second prefixed threshold TH is overcome at point B, all the channels are turned off, to avoid damage to the device. At this point the temperature can only decrease. When it reaches the temperature TL, at point C, all the channels can be turned on.

The temperature variation is generally a much slower signal than the electric signals present in an electronic circuit. Slow fluctuations of the temperature around TL (also of the fraction of degree) could cause multiple channel turning off. To avoid this problem it is convenient to add a small temperature hysteresis at the threshold TL. The problem does not exist at the higher threshold as the channels could not be reactivated once the temperature TH has been overcome.

Possible values of the thresholds could be for instance 160° C. for TL and 180° C. for TH.

The temperature determination means 10 that provide to the control system 12 an overcoming signal of a first prefixed threshold TL and an overcoming signal of a second prefixed threshold TH, can for instance be constituted by two sensors that sense the temperatures TH and TL by means of suitable reference circuits. At the sensor output are preferably present two low-pass filters that effect a necessary filtration to eliminate possible fast interferences that could cause unwanted turning off of the channels.

The use of a circuit as described above could not be an optimal solution, since the measurement tolerances between the two sensors could dangerously approach the two thresholds.

Figure 3:
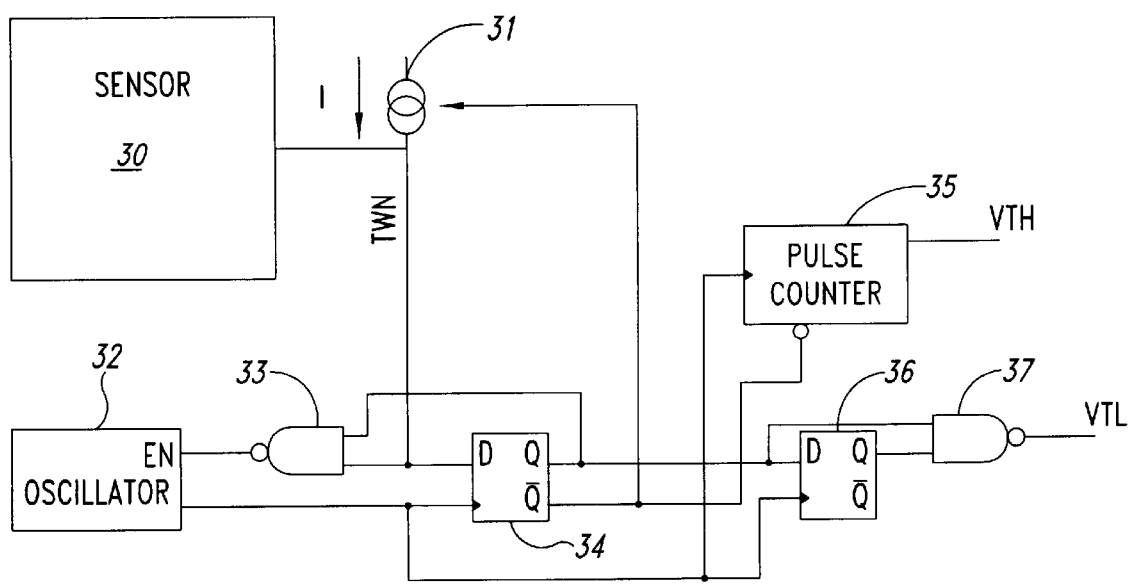
FIG. 3 represents a block schematic of the temperature determination means in accordance with the present invention.

A more sure and preferable solution is that of using only one sensor. In FIG. 3 is illustrated a possible embodiment.

The temperature determination means 10 comprise a sensor 30, connected to a current generator 31. The output circuit of the sensor 30 can be for instance constituted by a current generator connected to a transistor collector the emitter of which is connected to ground and the base opportunely biased, the output terminal is connected to the transistor collector. The current generator 31 is activated by a signal coming from the inverted-Q output of the D type flip-flop 34. The current generator 31 is connected to the input D of the flip-flop 34 and also to an input of a NAND gate 33, the other input of the NAND gate 33 is connected to the Q output of the flip-flop 34. The output of the NAND 33 enables the working of an oscillator 32, the output of which is connected to the clock of the flip-flop 34, to the clock of another D type flip-flop 36 and also to the input of a pulse counter 35, the reset input of which is connected to the inverted-Q output of the flip-flop 34. The Q output of the flip-flop 34 is also connected to the D input of the flip-flop 36 and to the input of a NAND gate 37; to the other input of the NAND gate 37 the Q output of the flip-flop 36 is connected. The output of the NAND gate 37 corresponds to the signal VTL, the output of the pulse counter 35 corresponds to the signal VTH.

If the temperature is lower than TL the current generator 31 is turned off and the oscillator 32 is deactivated by the NAND gate 33. When the temperature overcomes the threshold TL and stays under TH, the signal TWN, that is at the output of the generator 31, goes to a low level, the oscillator 32 is activated, and at the first leading edge the flip-flop 34 switches over, the output Q goes to a logical low level and the inverted-Q output goes to a logical high level, the generator 31 is activated, taking again the signal TWN to a high level. At the following leading edge of the oscillator 32, the flip-flop 34 switches over again, the current generator 31 is deactivated and starts another cycle. The signal TWN, when the temperature is comprised between TL and TH has a waveform that alternates between the low level and the high level.

The signal VTL is generated by means of a further D type flip-flop 36 in combination with the NAND gate 37. The filter function is provided by the oscillator period.

If the temperature overcomes TH, the signal TWN stays always low. The voltage VTH is generated by the output of the pulse counter 35 that counts K prefixed periods of the oscillator 32 fulfilling a filtering function. The number of the K periods are opportunely chosen on the basis of the filtering requirement.

Figure 4:
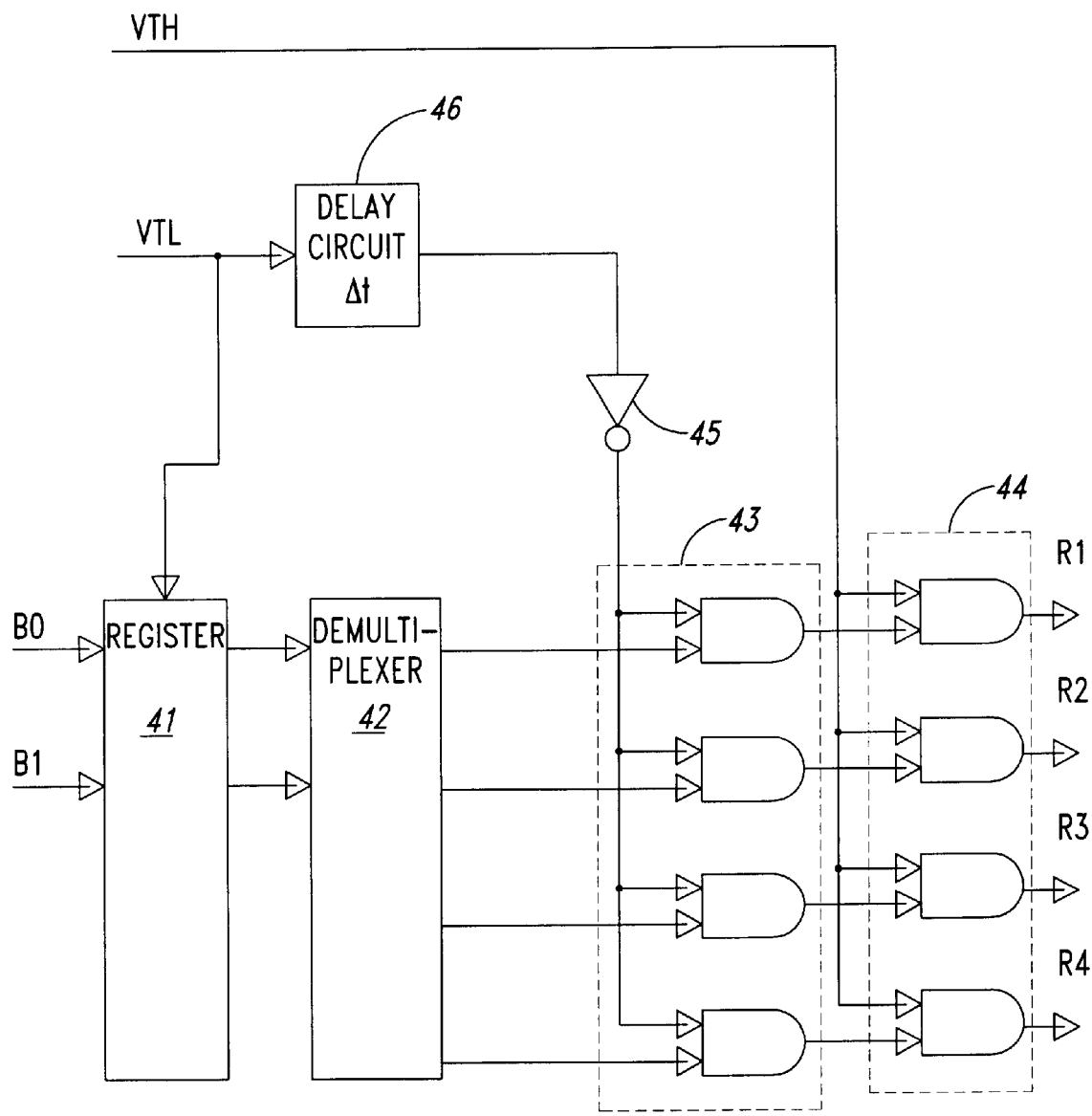
FIG. 4 represents a block schematic of the control system of FIG. 1.

FIG. 4 represents a block schematic of the control system 12 that comprises a register 41 which receives in input the signals B0, B1 of channel identification that dissipates the greater power quantity and is enabled by the signal VTL provided by the temperature determination means 10.

The datum stored by the register 41 is a binary number indicating the channel that dissipates more power. To send a turning off signal to the selected channel, the demultiplexer 42 is used, the outputs of which are placed at the inputs of a series of AND gates 43 that provide the turning off signal of the interested channel to a series of AND gates 44. To the other inputs of the AND gates 43 is applied the signal VTL, inverted through the inverter 45.

The turning off signal is generated, with a delay Dt with respect to the signal VTL, by means of the delay circuit 46 placed between the signal VTL and the inverter 45. This delay is necessary to assure that the turning off signal is generated only after the correct information storage in the register 41.

The memory circuit of the register 41 is used to prevent turning off other channels in addition to the channel with the greatest dissipation, as the turning off of a channel carries to the output a modification of the identification circuit that, with the lack of such a register 41, will result in all of the channels being turned off in sequence.

The register 41 can be placed either before or after the demultiplexer 42 without altering the circuit operations.

The output of the AND gates 43 is set in input to a series of AND gates 44, the signal VTH is set at the other input of the AND gates 44.

The output of the AND gates 44 provides the turning off signal R1-R4 to each of the channels. In the case of overcoming of the threshold VTL, the AND gates 43 provide to the AND gates 44, that in this case are transparent, the signal of turning off of only a channel at a time. In case of overcoming of the threshold VTH, the AND gates 44 are forced to send a turning off signal to all the present channels.

Figure 5:
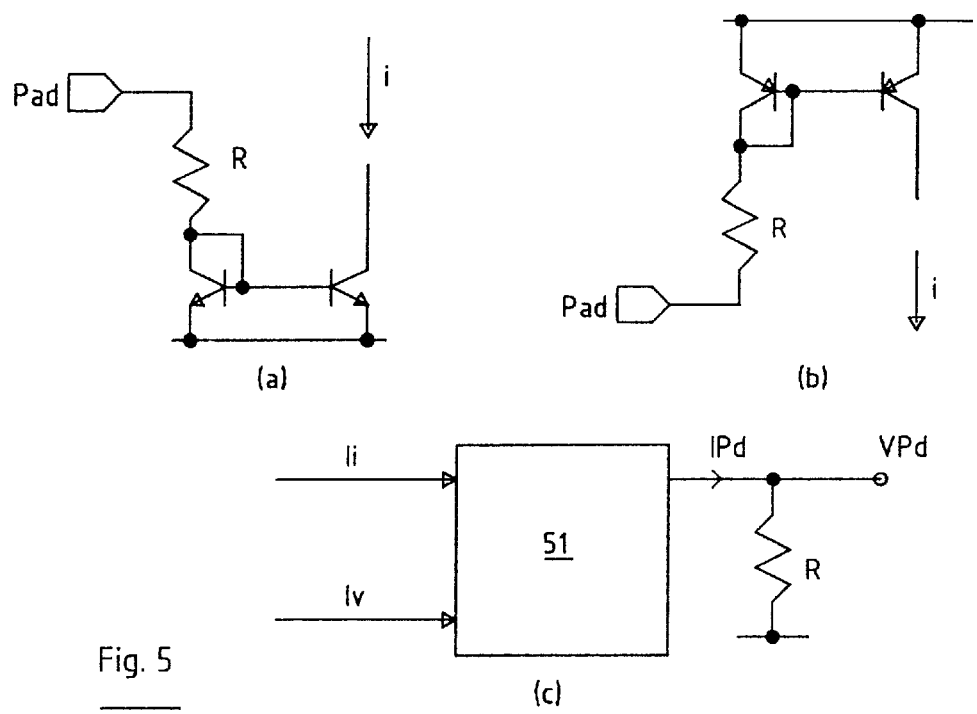
FIGS. 5a–5c represent schematics of circuits able to provide a voltage proportional to the dissipated power.

The signals proportional to the dissipated power of each channel in input at the identification system 11 are voltages proportional to the dissipated power. These voltages could be obtained with known circuits, some of these are illustrated as examples in FIG. 5. The circuit of FIG. 5a could be used with switch circuits toward ground (low-side), where a current proportional to the output voltage is obtained. It is a current mirror, well known to the skilled in the art, which comprises an external terminal (Pad) connected to a resistance and therefore to a first transistor connected like a diode, the first transistor is connected to a second transistor in which the current determined by the voltage applied to the Pad, by the resistance and by the diode characteristics is mirrored. Generally the low-side type circuits have a low voltage drop at their terminals, the output voltage starts to increase only when the protective circuit for the current limitation starts to work. When that happens the dissipated power increases considerably. Generally this current is constant and known, in this case the only variable in the power calculus is the output voltage. Opportunely choosing the resistance R value, we will get a current proportional to the power dissipated in play. A similar discussion is valid for the switch circuits toward battery (High-side), in this case the circuit of FIG. 5b will be used. It is a current mirror similar to that of FIG. 5a with the only difference that it provides a current coming out from its terminal. The circuit of FIG. 5c is instead used for a more generic application, that is when the channel can have notable voltage drops with varying currents, for instance in the case of the voltage regulators, power output stages etc. In this case in addition to the circuit seen before that provides a current Ii proportional to the current that flows in the channel, another circuit is necessary that mirrors a current Iv proportional to the voltage at the channel terminals. To get a current proportional to the dissipated power it is used a circuit like for instance that of FIG. 5c, that is a known current multiplier 51, that receives in input the Iv and Ii signals. If there is an interest in a voltage proportional to the dissipated power, and not in a current as that flowing out from the multiplier a resistance R is applied between the output and the ground, as shown in FIG. 5c.

Figure 6:
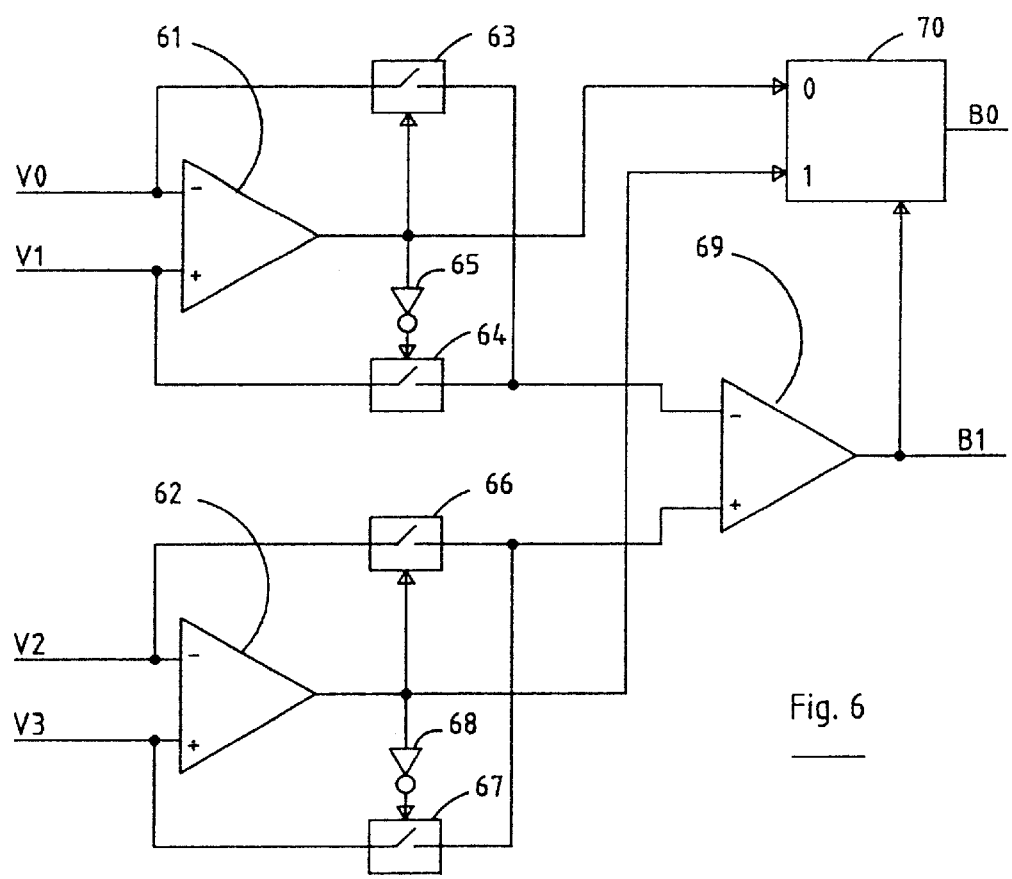
FIG. 6 represents a block schematic of the elaboration system of FIG. 1.

The identification system 11 receives the information on the dissipated power as an analog or digital signal, in our example it is a voltage proportional to the dissipated power, and it determines which channel is dissipating the highest power. A possible way to realize the elaboration of this information is represented in FIG. 6. The circuit elaborates the analog signals V0, V1, V2 and V3 (proportional to the power dissipated by the channels 15a, 15b, 15c and 15d) applied to the inputs of two voltage comparators 61 and 62. They have also been applied respectively to a terminal of the controlled switches 63, 64, 66 and 67.

The outputs of the comparators 61 and 62 are applied to the inputs of a multiplexer 70. The comparator 61 output is applied directly to the control of the switch 63, and applied through an inverter 65 to the control of the switch 64. The comparator 62 output is applied directly to the control of the switch 66, and applied through an inverter 68 to the control of the switch 67.

The other terminals of the switches 63 and 64 are connected together and applied to the input of a further voltage comparator 69. The other terminals of the switches 66 and 67 are connected together and applied to the input of a further voltage comparator 69.

The comparator 69 output provides the most significant bit B1 of the binary number that enables identification of the channel with the most dissipation. This output signal has also been applied to the multiplexer 70 selection input which provides as output the least significant bit B0. If at the selection input B1=0 is applied the multiplexer 70 will select the signal at the comparator output 61, if B1=1 is applied the multiplexer 70 will select the signal at the comparator output 62.

With this circuit, by the opening and closing of the switches 63, 64, 66 and 67, the most heat dissipating channels are selected and the information of these are examined again at the following stage.

In this way at the last stage (comparator 69) the two most dissipating channels will always be present, for the last comparison. The circuit in FIG. 6 represents the case in which there are four channels, but adding other stages, this circuit could be easily widened to manage a greater number of channels.

What is claimed is:

1. A temperature control system for an integrated circuit comprising:
   at least one device which generates heat because of elevated dissipated power values;
   a sensor element providing a signal that is proportional to the dissipated power of said at least one heat generating device;
   an elaboration circuit receiving the signal proportional to the dissipated power of said at least one heat generating device and configured to generate a turning-off signal; and
   a turning-off circuit of said at least one heat generating device responsive to the turning-off signal of said elaboration circuit, said sensor element comprising a temperature sensor providing in output a signal proportional to the temperature of the integrated circuit to said elaboration circuit and that said elaboration circuit receives in input said signal correlated to the working conditions of said at least one heat generating device and it provides in output to said turning-off circuit a turning-off signal when said signal proportional to the temperature overcomes a first prefixed level.

2. The temperature control system of claim 1 wherein said signal proportional to the dissipated power is a current proportional to the dissipated power.

3. The temperature control system of claim 1 wherein said sensor element comprises a first current mirror that provides a current proportional to the voltage at the terminals of said at least one heat generating device.

4. The temperature control system of claim 3 wherein said sensor element further comprises a second current mirror that provides a current proportional to the current flowing in said at least one heat generating device.

5. The temperature control system of claim 4 wherein said sensor element comprises a multiplier circuit able to receive in input said current proportional to the voltage at the terminals of said heat generating device and said current proportional to the current flowing in said heat generating device and to provide a current proportional to the dissipated power.

6. The temperature control system of claim 1 comprising a plurality of heat generating devices with elevated dissipated power values and relative turning off circuits; and said sensor element comprising a temperature sensor providing in output a signal proportional to the temperature of the integrated circuit to said elaboration circuit and that said elaboration circuit receives in input said signal proportional to the temperature and a signal correlated to the working conditions of each heat generating device and it provides in output a turning off signal to the turning off circuit relative to the device that dissipates the highest power quantity when said signal proportional to the temperature overcomes a first prefixed level.

7. The temperature control system of claim 6 wherein said elaboration circuit provides in output a turning off signal to all the turning off circuits when said signal proportional to the temperature overcomes a second prefixed level.

8. The temperature control system of claim 4 wherein said temperature sensor is placed in a point of the circuit equidistant from the points in which the power is dissipated.

9. A temperature control method for an integrated circuit having at least one heat generating device, comprising:
   sensing the working conditions of said at least one heat generating device relative to the dissipated power of said at least one heat generating device;
   elaborating the information relative to the working conditions of said at least one heat generating device;
   generating a turning off signal to said at least one heat generating device in response to the elaborated information.

10. A temperature control system for an integrated circuit having devices that dissipate power, the system comprising:
    a heat sensing circuit configured to generate a first dissipation signal proportional to the power dissipated by the integrated circuit;
    an identification circuit configured to generate an identification signal that identifies the device dissipating the most power in the integrated circuit; and
    a control circuit configured to receive the dissipation signal and the identification signal and to generate a turning-off signal to the device dissipating the most power when the dissipation signal reaches a first predetermined value.

11. The system of claim 10, wherein the heat sensing circuit is further configured to generate a second dissipation signal proportional to the power dissipated by the integrated circuit; and further wherein the control circuit is configured to receive the second dissipation signal and to generate a turning-off signal to all devices dissipating power in the integrated circuit when the second dissipation signal reaches a second predetermined value.

12. The system of claim 11, wherein the second predetermined value is greater than the first predetermined value.

13. The system of claim 11, further comprising a turning-off circuit coupled to each of the devices in the integrated circuit, each turning-off circuit having an input coupled to the control circuit for receiving the turning-off signal.

14. The system of claim 11, wherein the heat sensing circuit comprises a sensor configured to receive in a first input a current proportional to the voltage of the devices that dissipate power and a second input to receive a current proportional to the current flowing in the devices that dissipate power, and to generate a current therefrom that is proportional to the dissipated power of the integrated circuit.

15. The system of claim 11, wherein the heat sensing circuit comprises a sensor configured to receive in a first input a current proportional to the voltage of the devices that dissipate power and a second input to receive a current proportional to the current flowing in the devices that dissipate power, and to generate a voltage therefrom that is proportional to the dissipated power of the integrated circuit.

16. A method for controlling temperature in an integrated circuit having devices that dissipate heat, the method comprising:
    determining power dissipated by the integrated circuit;
    comparing dissipated power of the integrated circuit to a first threshold value;
    determining which device in the integrated circuit is dissipating the greatest power; and
    generating a turning-off signal to the device that is dissipating the greatest power when the dissipated power in the integrated circuit exceeds the first threshold value.

17. The method of claim 16, further comprising comparing the dissipated power in the integrated circuit to a second threshold value and generating a turning-off signal to all devices that dissipate power in the integrated circuit when the dissipated power exceeds a second threshold value.

18. The method of claim 16, wherein determining power dissipated by the integrated circuit comprises receiving a first current proportional to the voltage of the devices dissipating power in the integrated circuits, receiving a second current proportional to the current flowing in the devices dissipating power in the integrated circuit, and generating a current therefrom that is proportional to the dissipated power of the integrated circuit.

19. The method of claim 16, wherein determining power dissipated by the integrated circuit comprises receiving a first current proportional to the voltage of the devices dissipating power in the integrated circuits, receiving a second current proportional to the current flowing in the devices dissipating power in the integrated circuit, and providing a voltage therefrom that is proportional to the dissipated power of the integrated circuit.

* * * * *